United States Patent
Kato

(10) Patent No.: US 10,841,449 B2
(45) Date of Patent: Nov. 17, 2020

(54) IMAGE FORMING APPARATUS AND CONTROL METHOD OF IMAGE FORMING APPARATUS

(71) Applicant: TOSHIBA TEC KABUSHIKI KAISHA, Tokyo (JP)

(72) Inventor: Nobuyuki Kato, Nagaizumi Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/801,055

(22) Filed: Feb. 25, 2020

(65) Prior Publication Data
US 2020/0267276 A1 Aug. 20, 2020

Related U.S. Application Data

(63) Continuation of application No. 16/205,767, filed on Nov. 30, 2018, now Pat. No. 10,630,855.

(30) Foreign Application Priority Data

May 18, 2018 (JP) ................................ 2018-096440

(51) Int. Cl.
*G03G 15/20* (2006.01)
*H04N 1/00* (2006.01)
(Continued)

(52) U.S. Cl.
CPC ..... *H04N 1/00896* (2013.01); *G03G 15/2039* (2013.01); *G03G 15/80* (2013.01); *H04N 1/32719* (2013.01); *H04N 2201/0093* (2013.01)

(58) Field of Classification Search
CPC .... G03G 15/80; G03G 15/2039; H04N 1/896; H04N 1/32719; H04N 2201/0093
(Continued)

(56) References Cited

U.S. PATENT DOCUMENTS 5,068,675 A 11/1991 Momose
7,792,451 B2 * 9/2010 Kim ................... G03G 15/2039
399/69

(Continued)

OTHER PUBLICATIONS

Non-Final Office Action on U.S. Appl. No. 16/205,767 dated Jun. 13, 2019.
(Continued)

*Primary Examiner* — Hoan H Tran
(74) *Attorney, Agent, or Firm* — Foley & Lardner LLP

(57) ABSTRACT

An image forming apparatus and a control method of an image forming apparatus which offers high convenience are described. An image forming section forms a toner image in a print medium, and fixes the toner image by a heated fixing device. A power circuit supplies power to the image forming section to heat the fixing device. A communication interface receives a facsimile call signal and a facsimile image signal. A system controller controls the image forming section and the power circuit such that, when the facsimile call signal and the facsimile image signal are received, the image forming section and the power circuit are controlled to form an image by the image forming section on the basis of the facsimile image signal and, when the facsimile call signal is received and the facsimile image signal is not received, the power circuit supplies power to the image forming section to heat the fixing device.

10 Claims, 4 Drawing Sheets

(51) Int. Cl.
*H04N 1/327* (2006.01)
*G03G 15/00* (2006.01)

(58) Field of Classification Search
USPC .............. 399/38, 67–70, 122, 320, 328
See application file for complete search history.

(56) References Cited

U.S. PATENT DOCUMENTS

| | | |
|---|---|---|
| 9,116,479 B2 | 8/2015 | Umezawa et al. |
| 9,116,497 B2 | 8/2015 | Miyazaki |
| 2006/0285867 A1* | 12/2006 | Takahashi .............. G03G 15/80 399/70 |
| 2017/0070630 A1 | 3/2017 | Kozuka et al. |

OTHER PUBLICATIONS

Notice of Allowance on U.S. Appl. No. 16/205,767 dated Jan. 6, 2020.

* cited by examiner

IMAGE FORMING APPARATUS AND CONTROL METHOD OF IMAGE FORMING APPARATUS

CROSS-REFERENCE TO RELATED APPLICATIONS

This application is a continuation of and claims priority to co-pending U.S. application Ser. No. 16/205,767 filed Nov. 30, 2018, which is based upon and claims the benefit of priority from Japanese Patent Application No. 2018-096440, filed May 15, 2018, the entire contents of all of which are incorporated herein by reference.

FIELD

Embodiments described herein relate generally to an image forming apparatus and a control method of the image forming apparatus.

BACKGROUND

An image forming apparatus forms an image in a print medium on the basis of print data. The image forming apparatus forms a toner image in the print medium, and fixes the toner image by a highly-heated fixing device (fixing roller) to form an image in a paper sheet.

In a case where the printing is not performed for a predetermined time, the image forming apparatus transitions to a power saving mode without heating the fixing device in order to suppress power consuming during standby. In a case where a user approaches, or a case where a signal necessary for the printing is input, the image forming apparatus releases the power saving mode, and starts heating the fixing device.

However, it takes a time until the fixing device is heated equal to or more than a temperature (predetermined temperature) in order to fix the toner. Therefore, there is a possibility that it takes a time until the printing is actually performed after the user operates the image forming apparatus.

DETAILED DESCRIPTION

An exemplary embodiment provides an image forming apparatus and a control method of the image forming apparatus which offers high convenience.

In general, according to at least one embodiment, an image forming apparatus includes an image forming section configured to form a toner image in a print medium and fix the toner image by a heated fixing device, a power circuit configured to supply power to the image forming section to heat the fixing device, a communication interface configured to receive a facsimile call signal and a facsimile image signal, and a system controller. The system controller controls the image forming section and the power circuit such that, in a case where the facsimile call signal and the facsimile image signal are received, the image forming section and the power circuit are controlled to form an image by the image forming section on the basis of the facsimile image signal and, in a case where the facsimile call signal is received and the facsimile image signal is not received, the power circuit is controlled to supply power to the image forming section to heat the fixing device.

Figure 1:
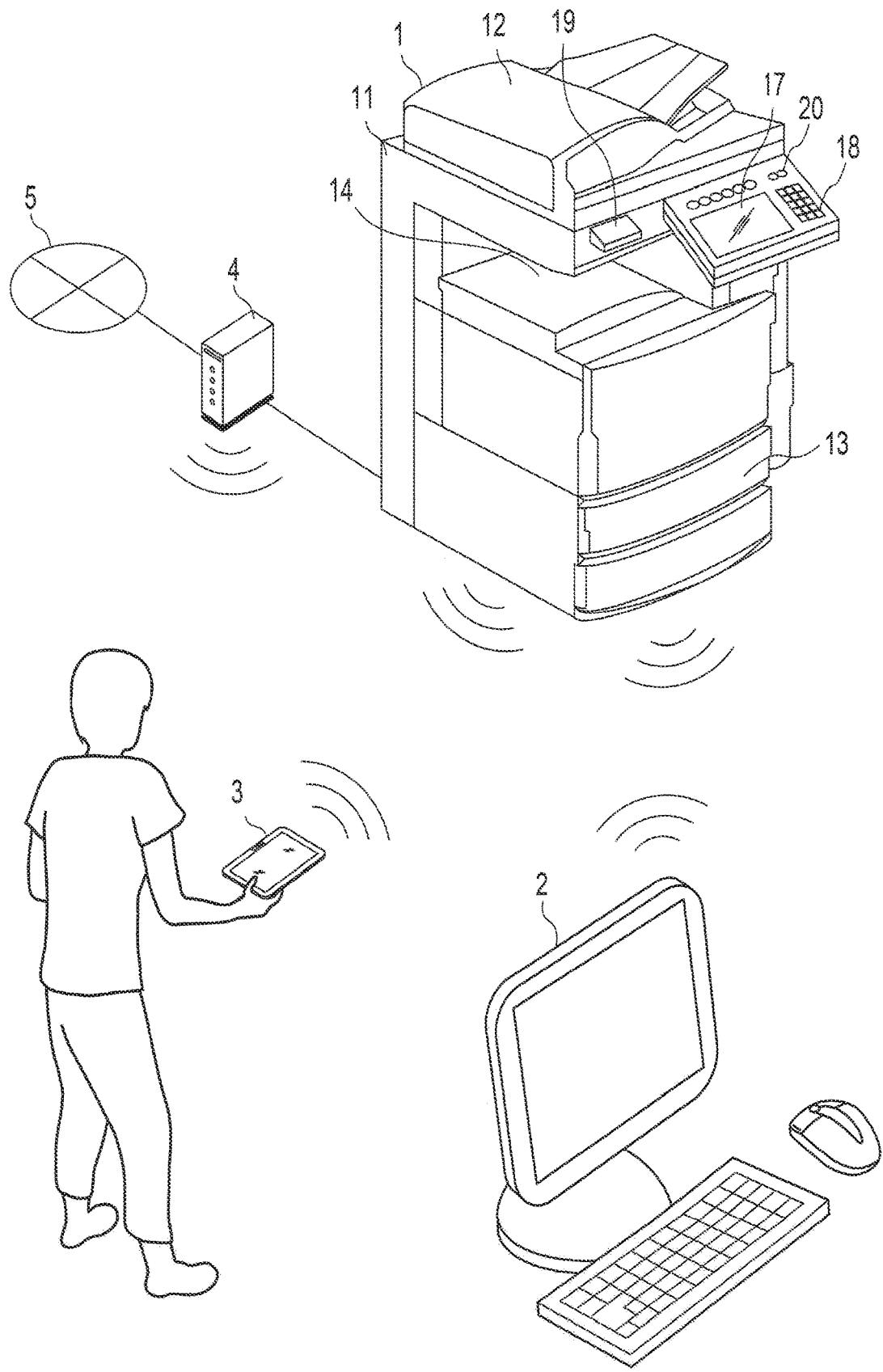
FIG. 1 is an explanatory diagram for describing an exemplary configuration of an image forming apparatus according to at least one embodiment.
Figure 2:
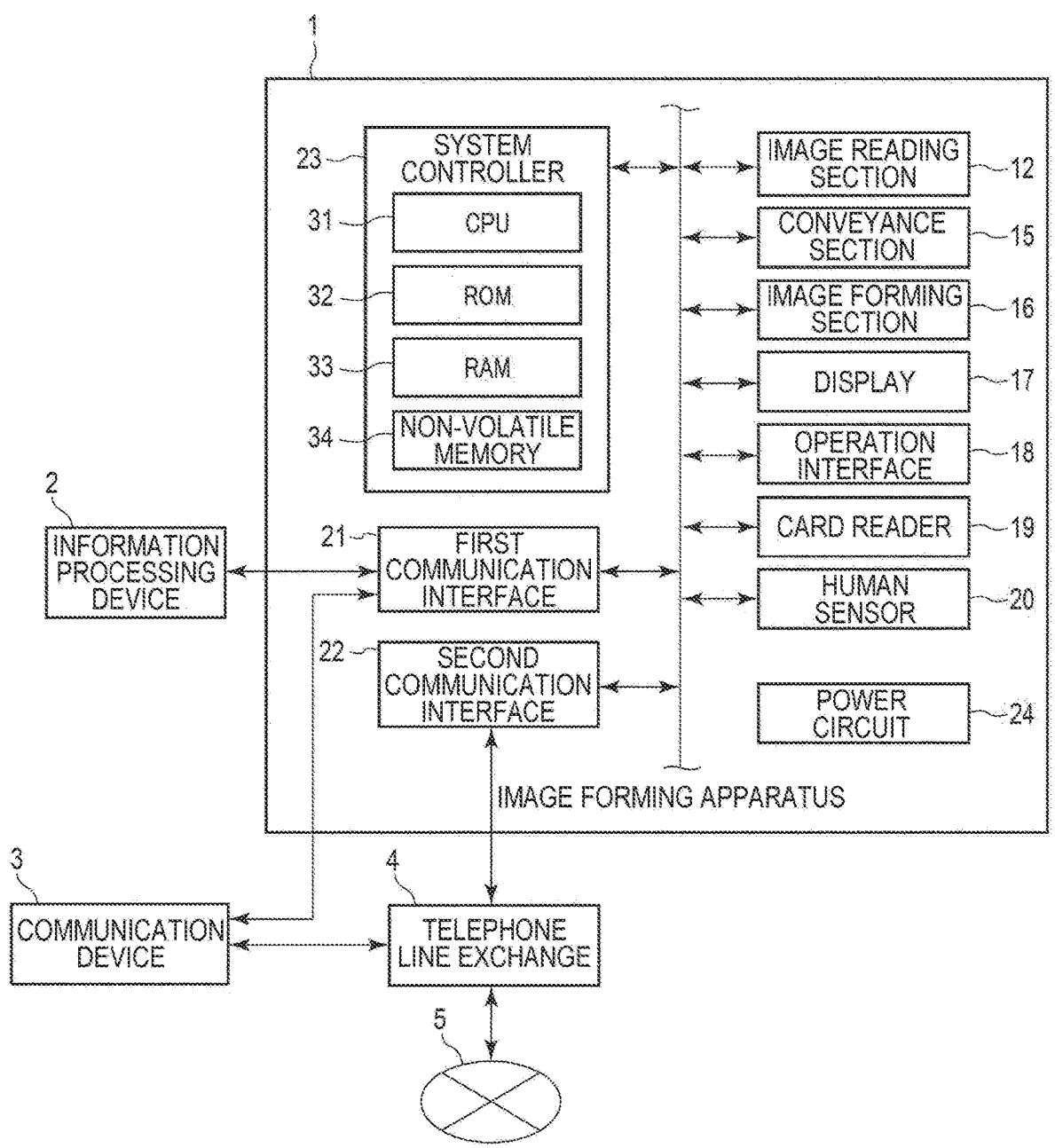
FIG. 2 is an explanatory diagram for describing an exemplary configuration of the image forming apparatus according to at least one embodiment.

Hereinafter, an image forming apparatus and a control method of the image forming apparatus according to an embodiment will be described with reference the drawings. FIG. 1 is an explanatory diagram for describing an exemplary arrangement of the outer appearance of an image forming apparatus 1 according to at least one embodiment. FIG. 2 is an explanatory diagram for describing an exemplary configuration of a control system of the image forming apparatus 1.

The image forming apparatus 1 is an apparatus which forms an image in a print medium based on image data (print data) for printing, and discharges the print medium with the image formed. The image forming apparatus 1 can communicate with other devices corresponding to Wi-Fi (registered trademark) or Bluetooth (registered trademark) in a wireless manner. In addition, the image forming apparatus 1 can communicate with a device connected to a LAN in a wired manner.

The image forming apparatus 1, for example, communicates with an information processing device 2 or a portable telephone such as a communication device 3, and receives the print data. In addition, the image forming apparatus 1 scans and reads an original document, and can generate the print data.

In addition, the image forming apparatus 1 is connected to a telephone line 5 through a telephone line exchange 4. The image forming apparatus 1 can receive the print data from other devices connected to the telephone line 5 through the telephone line exchange 4. In other words, the image forming apparatus 1 serves as a facsimile which prints on the basis of an image signal supplied from a device connected to the telephone line 5 having a facsimile function.

The image forming apparatus 1 is, for example, a multi-function printer (MFP) which performs various types of processing such as image formation while transferring a recording medium such as the print medium. The image forming apparatus 1 is, for example, a solid scanning type of printer (for example, an LED printer) which scans a recording medium such as the print medium using an LED array which performs various types of processing such as image formation while transferring a recording medium.

The image forming apparatus 1 charges a photoconductive drum and irradiates the photoconductive drum with a light according to the print data so as to form an electrostatic latent image in the photoconductive drum. The image forming apparatus 1 attaches toner to the latent image formed in the photoconductive drum and transfers the toner attached to the latent image to the print medium to form a toner image on the print medium. In addition, the image forming apparatus 1 interposes the print medium with the toner image formed using a fixing device (fixing roller) heated at a high temperature by a heater to fix the toner image formed on the print medium. With this configuration, an image is formed on the print medium.

The information processing device 2 is a device which supplies the print data to the image forming apparatus 1. The information processing device 2 is, for example, a mobile device such as a notebook PC, a smart phone, or a tablet PC. The information processing device 2 transmits the print data to the image forming apparatus 1 by a wired or wireless manner. The information processing device 2 transmits the print data to the image forming apparatus 1 by a wireless manner such as Wi-Fi (registered trademark) or Bluetooth (registered trademark). In addition, in a case where the information processing device 2 is connected to the image forming apparatus 1 by a LAN, the print data is transmitted to the image forming apparatus 1 through a wired manner.

The communication device 3 is a device which transmits a signal to any telephone number. In addition, the communication device 3 can also supply the print data to the image forming apparatus 1. The communication device 3 is, for example, a device such as a smart phone. The communication device 3 transmits the print data to the image forming apparatus 1 by a wireless manner such as Wi-Fi (registered trademark) or Bluetooth (registered trademark).

The telephone line exchange 4 is an exchange in the telephone line 5. The telephone line exchange 4 is connected to the image forming apparatus 1 and the telephone line 5 in a wired manner. In addition, the telephone line exchange 4 is set to communicate with a plurality of the communication devices 3 in a wireless manner. The telephone line exchange 4 transmits and receives various types of signals with respect to other telephone line exchanges through the telephone line 5.

The telephone line exchange 4 controls the connection between the extensions. The extension indicates a communication device in a predetermined group set in the telephone line exchange 4. In this embodiment, the image forming apparatus 1 and the communication device 3 correspond to the extensions from the viewpoint of the telephone line exchange 4.

In addition, the telephone line exchange 4 controls the connection from the extension to an external line or from the external line to the extension. The external line indicates a device which is connected to another telephone line exchange connected to the telephone line 5. In other words, the external line is a device other than the above group.

In the communication device 3, there is provided both or any one of an extension number (extension address) which is used as a destination in the case of connection of voice call between the extensions and an external line number (external line address) which is used as a designation in the case of connection of voice call from the external line to the extension.

For example, in a case where a call signal (voice call signal) of the voice call at another extension is received from the communication device 3 (extension), the telephone line exchange 4 transmits the voice call signal to the communication device 3 corresponding to the extension number designated by the voice call signal.

In addition, for example, in a case where the call signal (voice call signal) of the voice call at the extension is received from a device (external line), the telephone line exchange 4 transmits the voice call signal to the communication device 3 corresponding to the external line number designated by the voice call signal (or a control signal transferring between the telephone line exchanges).

In addition, in the image forming apparatus 1, there is set a facsimile number (facsimile address) which is used as a destination when a facsimile is connected from the external line having a facsimile function.

For example, in a case where a facsimile call signal (for example, CNG signal) is received from the external line having the facsimile function, the telephone line exchange 4 transmits the CNG signal to the image forming apparatus 1 corresponding to the facsimile number designated by the CNG signal (or a control signal transferring between the telephone line exchanges). In addition, in a case where the external line having the facsimile function and the image forming apparatus 1 are connected, the telephone line exchange 4 transmits the image signal supplied from the external line having the facsimile function to the image forming apparatus 1. The image signal is a signal obtained by converting an image (transmission source) generated by scanning the original document using the facsimile. Hereinafter, the image signal related to the facsimile will be called a facsimile image signal.

Further, for example, in a case where the voice call signal of the voice call in which the facsimile number of the image forming apparatus 1 in the group is designated as a destination is received from the communication device 3 (extension), the telephone line exchange 4 transmits the facsimile call signal to the image forming apparatus 1 corresponding to the facsimile number. Further, the telephone line exchange 4 supplies different facsimile call signals to the image forming apparatus 1 such that the facsimile call signal transmitted to the image forming apparatus 1 on the basis of a signal from the communication device 3 (extension) and the facsimile call signal transmitted to the image forming apparatus 1 on the basis of a signal from the external line can be distinct.

First, the image forming apparatus 1 will be described. The image forming apparatus 1 includes, as illustrated in FIGS. 1 and 2, a housing 11, an image reading section 12, a paper feeding cassette 13, a paper discharge tray 14, a conveyance section 15, an image forming section 16, a display 17, an operation interface 18, a card reader 19, a human sensor 20, a first communication interface 21, a second communication interface 22, a system controller 23, and a power circuit 24. The housing 11 is a main body which supports the respective components of the image forming apparatus 1.

The image reading section 12 is configured to read an image from the original document. The image reading section 12 includes, for example, a scanner and an automatic document feeder (ADF).

The scanner includes an image sensor, an illumination device, an optical element, and the like. The image sensor is an image capture element in which pixels are arranged in a line shape to convert light into an electrical signal (image signal). The image sensor is, for example, configured by a charge coupled device (CCD), a complementary metal oxide semiconductor (CMOS), or other image capture elements. The illumination device emits the light to the original document. The optical element is used to form an image in the pixels of the image sensor using the light from a predetermined reading range. The image of the reading range of the optical element is formed in the pixels of the image sensor by the light which is emitted from the illumination device to the original document and reflected thereon. With this arrangement, the scanner reads the image from the original document.

The ADF is a mechanism to convey the original document. The ADF takes and conveys the original document to the predetermined reading range.

The image reading section 12 continuously acquires the image of each line by the image sensor while conveying the original document by the ADF so as to acquire the entire image of the original document. In addition, the image reading section 12 may be configured to continuously acquire the image of each line by the image sensor from the stationary original document while moving the scanner so as to acquire the entire image of the original document.

The paper feeding cassette 13 is a cassette to store the print medium. The paper feeding cassette 13 is configured to supply the print medium from the outside of the housing 11. For example, the paper feeding cassette 13 is configured to be drawn from the housing 11.

The paper discharge tray 14 is a tray to support the print medium which is discharged from the image forming apparatus 1.

The conveyance section 15 conveys the print medium. The conveyance section 15 is configured by a plurality of guides and a plurality of rollers, and includes a conveyance path through which the print medium is conveyed. For example, a conveyance roller is rotated on the basis of the control of the system controller 23, and the print medium is conveyed along the conveyance path.

The conveyance section 15 includes, for example, a take-in roller, a paper feeding conveyance path, a paper discharge conveyance path, and a reverse conveyance path. The take-in roller takes the print medium stored in the paper feeding cassette into the paper feeding conveyance path. The paper feeding conveyance path conveys the print medium taken from the paper feeding cassette by the take-in roller to the image forming section. The paper discharge conveyance path discharges the print medium with an image formed by the image forming section from the housing 11. The discharged print medium is stacked in the paper discharge tray 14.

The reverse conveyance path is a conveyance path which reverses the front and rear surfaces of the print medium with the image formed by the image forming section 16, and supplies the print medium again to the image forming section 16.

The image forming section 16 forms the image in the print medium on the basis of the control of the system controller 23. The image forming section 16 may include process units, a transfer belt, a transfer roller, and a fixing roller. For example, the image forming section 16 includes the process units for every different color such as cyan, magenta, yellow, and black.

In each process unit, a toner cartridge filled with toner is mounted. The toner cartridge is a vessel which is filled with toner. The process unit receives the toner from the toner cartridge, and forms an image of toner (toner image) in a transfer belt in order to form an image in the print medium. Specifically, the process unit charges the drum, and forms an electrostatic latent image in the charged drum in accordance with the print data. The process unit attaches the toner to the latent image formed in the drum, and moves the toner attached to the electrostatic latent image to the transfer belt.

The transfer belt is a member to receive the toner image formed in the surface of the drum, and to transfer the toner image to the print medium. The transfer belt is moved by the rotation of the roller. The transfer belt receives the toner image formed in the drum at a position abutting on the drum, and carries the received toner image to the transfer roller.

The transfer roller is configured to interpose the transfer belt and the print medium. The transfer roller transfers the toner image on the transfer belt to the print medium.

The fixing roller (fixing device) is configured to interpose the print medium. The fixing roller is heated by a heater (not illustrated). The fixing roller presses the interposed print medium in the heated state to fix the formed toner image on the print medium. In other words, the fixing roller forms an image on the print medium by fixing the toner image.

The display 17 displays a screen according to a video signal input from a display control unit such as the system controller 23 or a graphic controller (not illustrated). For example, the display 17 displays a screen for various settings of the image forming apparatus 1.

The operation interface 18 includes various operation members. The operation interface 18 supplies an operation signal corresponding to an operation of the operation member to the system controller 23. The operation member is, for example, a touch sensor, a ten key, a power key, a paper feed key, various types of functions keys, or a keyboard. The touch sensor is, for example, a resistance film type of touch sensor or an electrostatic touch sensor. The touch sensor acquires information indicating a designated position in a certain region. The touch sensor is configured as a touch panel integrally with the display 17, and inputs a signal indicating a position touched on the screen displayed in the display 17 to the system controller 23. In addition, the operation interface 18 supplies an activate signal (interrupt signal) to the system controller 23 according to a predetermined operation.

The card reader 19 is an interface for communicating with an IC card held by a user of the image forming apparatus 1. The card reader 19 transfers data with the IC card in a contact communication manner or in a non-contact communication manner.

The IC card includes an IC chip and a communication circuit. The IC chip includes a CPU, a ROM, a RAM, and a non-volatile memory. The non-volatile memory of the IC chip contains identification information indicating the user who holds the IC card. The communication circuit is configured by an antenna or a contact terminal (contact pattern) for example. The communication circuit is electrically or magnetically connected to the card reader 19.

The card reader 19 communicates with the IC card to acquire the identification information of the user who holds the IC card from the IC card.

The human sensor 20 detects whether a person approaches the image forming apparatus 1. The human sensor 20 supplies the detection result indicating whether a person approaches to the system controller 23.

The first communication interface 21 is an interface for communicating with the information processing device 2 and the communication device 3 in a wireless manner. The first communication interface 21 communicates with the information processing device 2 and the communication device 3 in a wireless manner by Wi-Fi or Bluetooth. In a case where the print data is received, the first communication interface 21 supplies the received print data to the system controller 23.

The second communication interface 22 is an interface for communicating with a device connected to the telephone line 5 through the telephone line exchange 4. The second communication interface 22 includes, for example, a MODEM equipped with a telephone connector or a LAN connector, or both.

In a case where the print data is received through the LAN connector, the second communication interface 22 supplies the received print data to the system controller 23. In addition, in a case where the facsimile call signal is received from the telephone line exchange 4, the second communication interface 22 connects the MODEM and the telephone line exchange 4. The second communication interface 22 digitalizes the facsimile image signal supplied from the telephone line 5 through the telephone line exchange 4 by the MODEM, and supplies the digital signal to the system controller 23.

The system controller 23 controls the image forming apparatus 1. The system controller 23 includes, for example, a CPU 31, a ROM 32, a RAM 33, and a non-volatile memory 34.

The CPU 31 is an operational element (for example, a processor) which performs a calculation process. The CPU 31 performs various processes on the basis of data such as program stored in the ROM 32. The CPU 31 performs the program stored in the ROM 32 to serve as a control unit which can perform various operations.

The ROM 32 is a non-volatile memory dedicated to reading. The ROM 32 stores a program and data to be used in the program.

The RAM 33 is a volatile memory which serves as a work memory. The RAM 33 temporally stores data in process of the CPU 31. In addition, the RAM 33 temporally stores a program which is performed by the CPU 31.

The non-volatile memory 34 is a recording medium which can store various types of information. The non-volatile memory 34 stores a program and data to be used in the program. The non-volatile memory 34 is, for example, a solid state drive (SSD), a hard disk drive (HDD), or other recording devices. Further, there may be provided with a memory interface such as a card slot into which a recording medium such as a memory card instead of the non-volatile memory 34.

The power circuit 24 converts AC power supplied from a commercial power source into DC power, and supplies the DC power to the image reading section 12, the conveyance section 15, the image forming section 16, the display 17, the operation interface 18, the card reader 19, the human sensor 20, the first communication interface 21, the second communication interface 22, and the system controller 23.

Next, a mode of the image forming apparatus 1 will be described. The image forming apparatus 1 switches various modes on the basis of the control of the system controller 23. For example, the image forming apparatus 1 switches a normal mode and a power saving mode on the basis of the control of the system controller 23.

The power saving mode is a mode in which the power is not supplied from the power circuit 24 to the conveyance section 15 and the image forming section 16, and a part of the system controller 23 is kept in activation. For example, in the power saving mode, the operation of the CPU 31 is stopped. A part of the system controller 23 in activation is, for example, a function of activating the CPU 31 in a case where a predetermined signal is input. For example, the system controller 23 activates the CPU 31 in a case where the interrupt signal is input from the first communication interface 21 or the second communication interface 22. Further, the power saving mode does not supply power to a heater which heats the fixing device of the image forming section 16. Therefore, in a case where the mode transitions from the normal mode to the power saving mode, the temperature of the fixing device is reduced.

The normal mode is a mode in which the power is supplied from the power circuit 24 to the conveyance section 15 and the image forming section 16, and the entire system controller 23 is operable. In the normal mode, there are states such as a warming-up state and a ready state. The warming-up state is a state in which the fixing device of the image forming section 16 is being heated up to a predetermined temperature by a heater. The ready state is a state in which the fixing device of the image forming section 16 has been heated up to the predetermined temperature, and a job (copy, print, facsimile output, etc.) related to the printing can be performed.

The CPU 31 of the system controller 23 generates a job related to the printing on the basis of an image acquired by the image reading section 12, the print data received by the first communication interface 21 or the second communication interface 22, or the facsimile image signal supplied from the second communication interface 22. The CPU 31 causes the conveyance section 15 and the image forming section 16 to operate to form the image in the print medium on the basis of the generated job.

Next, the transition of modes of the image forming apparatus 1 will be described. In a case where the power of the image forming apparatus 1 is shifted from OFF to ON, the CPU 31 is activated. When being activated, the CPU 31 transitions the image forming apparatus 1 to the warming-up state of the normal mode. In other words, the CPU 31 controls the power circuit 24, and causes the power circuit 24 to supply the power to the conveyance section 15 and the image forming section 16. With this configuration, the image forming apparatus 1 transitions to the warming-up state in which the fixing device of the image forming section 16 is heated up to the predetermined temperature by a heater. Further, in a case where the temperature of the fixing device of the image forming section 16 reaches the predetermined temperature, the CPU 31 transitions to the ready state in which the job related to the printing can be performed.

In addition, in a case where the state is the ready state of the normal mode and a job does not occur in a predetermined period of time, the CPU 31 controls the power circuit 24, causes the power circuit 24 to stop the power supply to the conveyance section 15 and the image forming section 16, and transitions to the power saving mode.

In addition, in a case where the print data is received at the time of the power saving mode of the image forming apparatus 1, the first communication interface 21 and the second communication interface 22 supply the activation signal (interrupt signal) to the system controller 23.

In addition, in a case where the facsimile call signal is received at the time of the power saving mode of the image forming apparatus 1, the second communication interface 22 supplies the activation signal (interrupt signal) to the system controller 23.

In addition, the operation interface 18 supplies the activation signal (interrupt signal) to the system controller 23 according to the operation at the time of the power saving mode.

In a case where the interrupt signal is received at the time of power saving mode, the system controller 23 activates the CPU 31. When being activated at the time of the power saving mode, the CPU 31 switches the mode of the image forming apparatus 1 from the power saving mode to the normal mode. In other words, the CPU 31 controls the power circuit 24, and causes the power circuit to supply the power to the conveyance section 15 and the image forming section 16. With this configuration, the image forming apparatus 1 transitions the fixing device of the image forming section 16 to the warming-up state where the fixing device is heated up to the predetermined temperature by a heater. In a case where the temperature of the fixing device of the image forming section 16 reaches the predetermined temperature, the CPU 31 transitions to the ready state in which the job related to the printing can be performed.

Figure 3:
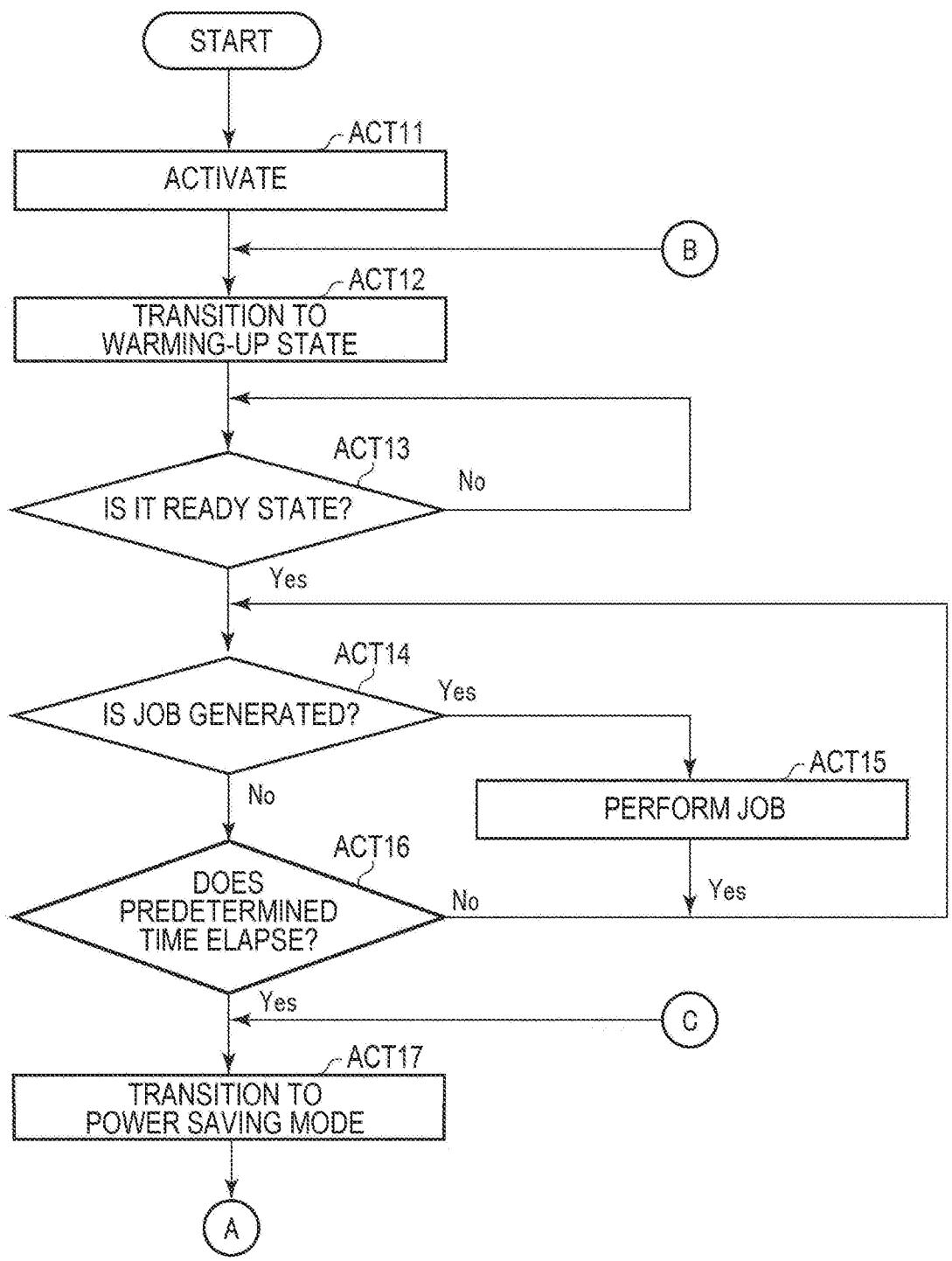
FIG. 3 is an explanatory diagram for describing an example of the operation of the image forming apparatus according to at least one embodiment.
Figure 4:
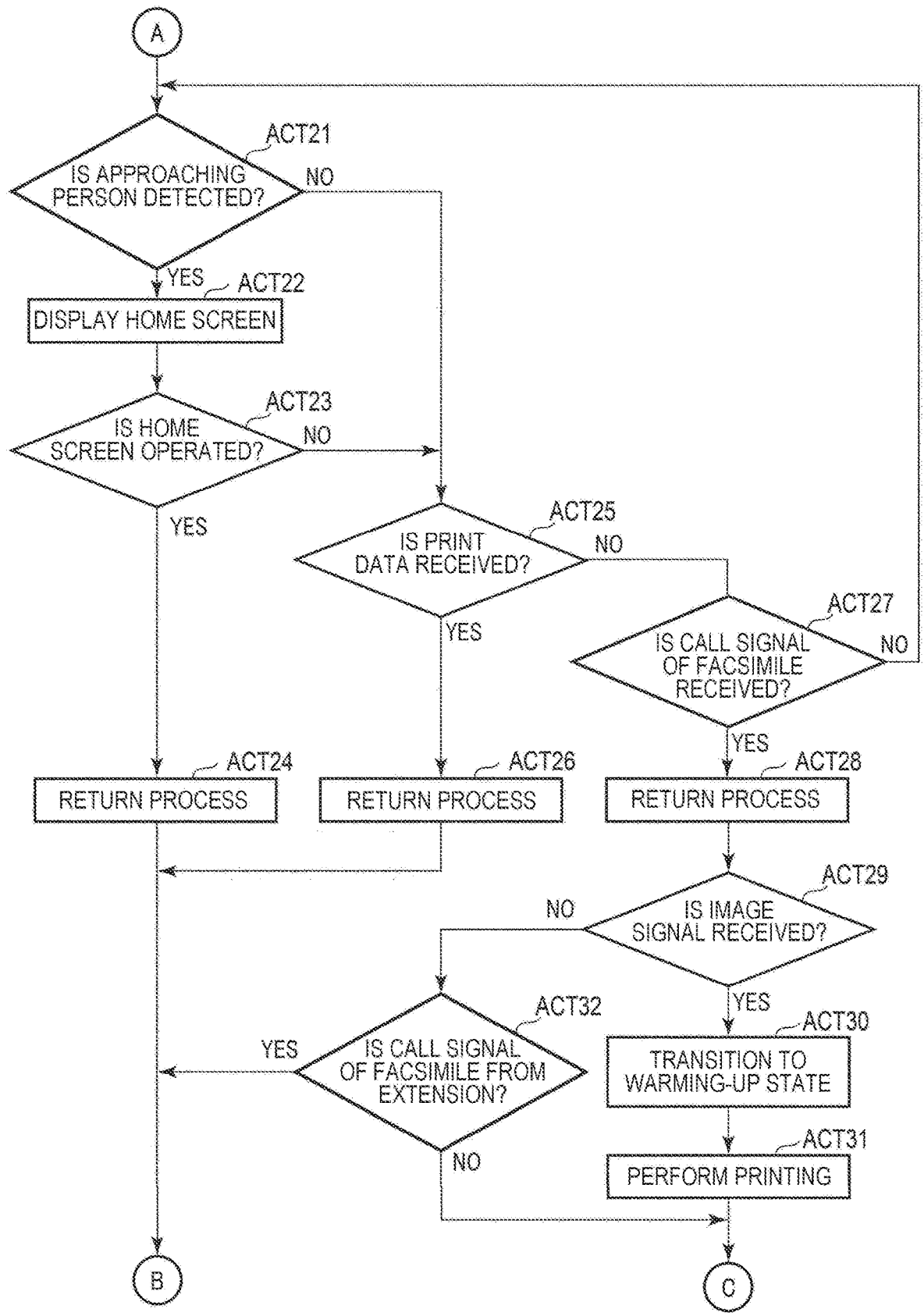
FIG. 4 is an explanatory diagram for describing an example of the operation of the image forming apparatus according to at least one embodiment.

Next, the operation of the image forming apparatus 1 will be described. FIGS. 3 and 4 are explanatory diagrams for describing the operation of the image forming apparatus 1.

As illustrated in FIG. 3, the system controller 23 of the image forming apparatus 1 activates the CPU 31 when the power is turned on (ACT 11).

When being activated from the power OFF state of the image forming apparatus 1, the CPU 31 transitions the image forming apparatus 1 to the warming-up state of the normal mode (ACT 12). In other words, the CPU 31 controls the power circuit 24, and causes the power circuit 24 to supply the power to the conveyance section 15 and the image forming section 16. With this configuration, the image forming apparatus 1 transitions to the warming-up state in which the fixing device of the image forming section 16 is heated up to the predetermined temperature by a heater.

The CPU 31 determines whether the fixing device of the image forming section 16 reaches the predetermined temperature, that is, whether it is the ready state (ACT 13). The CPU 31 repeatedly makes a determination on ACT 13 until the temperature of the fixing device of the image forming section 16 reaches the predetermined temperature. In a case where the CPU 31 determines that the temperature of the fixing device of the image forming section 16 reaches the predetermined temperature (ACT 13, YES), the CPU 31 transitions to the ready state.

The CPU 31 determines whether a job is generated in the ready state (ACT 14). In a case where it is determined that a job is generated (ACT 14, YES), the CPU 31 performs the job (ACT 15), and transitions to the process of ACT 14. In other words, in a case where a job such as copy, print, and facsimile output is generated in the ready state, the CPU 31 forms an image in the print medium on the basis of the job, and discharges the print medium from the housing 11.

In addition, in a case where it is determined that there is no job generated (ACT 14, NO), the CPU 31 determines whether a predetermined time elapses after performing the job or after transitioning to the ready state (ACT 16). For example, the CPU 31 determines whether one minute elapses after performing the job or after transitioning to the ready state. In a case where the CPU 31 determines that the predetermined time does not elapse after performing the job or after transitioning to the ready state (ACT 16, NO), the CPU 31 transitions to the process of ACT 14.

In a case where the CPU 31 determines that the predetermined time elapses after performing the job or after transitioning to the ready state (ACT 16, YES), the CPU 31 controls the power circuit 24, and causes the power circuit 24 to stop the power supply to the conveyance section 15 and the image forming section 16, and transitions to the power saving mode (ACT 17). In this case, the CPU 31 keeps some functions of the system controller 23, and stops its own operation.

When the CPU 31 transitions to the power saving mode, the system controller 23 determines whether a person approaches as illustrated in FIG. 4 (ACT 21). In other words, the system controller 23 determines whether there is received a detection result supplied from the human sensor 53 when the human sensor 53 detects a person who approaches the image forming apparatus 1.

In a case where it is determined that a person approaches (ACT 21, YES), the system controller 23 displays a home screen in the display 17. The home screen is a screen for the user to select a process which is performed in the image forming apparatus 1. In the home screen, there are displayed various icons corresponding to the processes such as "copy", "print", "scan", and "setting change".

The system controller 23 determines whether the home screen is operated (ACT 23). In addition, the system controller 23 may be configured to determine whether a predetermined operation member of the operation interface 18 is operated. In addition, in a case where an interrupt signal is input from the operation interface 18, the system controller 23 may determine that a predetermined operation is performed in the operation interface 18.

In a case where it is determined that the home screen is operated or a predetermined operation member of the operation interface 18 is operated (ACT 23, YES), the system controller 23 performs a return process (ACT 24). The return process is a process of activating the CPU 31 for example. After being activated, the CPU 31 transitions to the process of ACT 12 illustrated in FIG. 3. In other words, the CPU 31 switches the image forming apparatus 1 from the power saving mode to the warming-up state of the normal mode. With this configuration, the CPU 31 starts to heat the fixing device of the image forming section 16, transitions the image forming apparatus 1 to the ready state, and transitions the job-standby state.

In addition, in a case where it is determined that no person is detected in ACT 21 (ACT 21, NO), or in a case where it is determined that the home screen is not operated in ACT 23 (a predetermined operation member of the operation interface 18 is not operated) (ACT 23, NO), the system controller 23 determines whether the print data is received (ACT 25). In other words, the system controller 23 determines whether the print data is received from the first communication interface 21 or the second communication interface 22. In addition, in a case where the interrupt signal is input from the first communication interface 21 or the second communication interface 22 as described above, the system controller 23 may determine that the first communication interface 21 or the second communication interface 22 receives the print data.

In a case where it is determined that the print data is received (ACT 25, YES), the system controller 23 performs the return process (ACT 26). With this configuration, the CPU 31 is activated. After being activated, the CPU 31 generates a job on the basis of the received print data, and transitions to the process of ACT 12 illustrated in FIG. 3. In other words, the CPU 31 switches the image forming apparatus 1 from the power saving mode to the warming-up state of the normal mode. With this configuration, the CPU 31 starts to heat the fixing device of the image forming section 16, transitions the image forming apparatus 1 to the ready state, and performs the job. With this configuration, the printing is performed on the basis of the print data.

In addition, in a case where it is determined that the print data is not received in ACT 25 (ACT 25, NO), the system controller 23 determines whether the call signal of the facsimile is received (ACT 27).

As described above, in a case where the facsimile call signal is received from the telephone line exchange 4, the second communication interface 22 connects the MODEM and the telephone line exchange 4. At this time, the second communication interface 22 notifies the system controller 23 of the interrupt signal indicating that the facsimile call signal is received. The system controller 23 determines whether the call signal of the facsimile is received on the basis of the interrupt signal from the second communication interface 22.

In a case where it is determined that the call signal of the facsimile is not received (ACT 27, NO), the system controller 23 transitions to ACT 21. With this configuration, the system controller 23 repeatedly performs the processes of ACT 21, ACT 22, ACT 23, ACT 25, and ACT 27 until the operation interface 18 is operated, or the print data is received, or the call signal of the facsimile is received.

In a case where it is determined that the call signal of the facsimile is received (ACT 27, YES), the system controller 23 performs the return process (ACT 28). With this configuration, the CPU 31 is activated.

After being activated, the CPU 31 determines whether the facsimile image signal is received (ACT 29). As described above, in a case where the facsimile image signal is supplied from the telephone line 5 through the telephone line exchange 4, the second communication interface 22 digitalizes the facsimile image signal by the MODEM, and supplies the digital signal to the system controller 23. The CPU 31 determines whether the facsimile image signal is supplied from the second communication interface 22.

In a case where it is determined that the facsimile image signal is received (ACT 29, YES), the CPU 31 generates a job on the basis of the received facsimile image signal, and switches the image forming apparatus 1 from the power saving mode to the warming-up state of the normal mode (ACT 30). Further, when the fixing device of the image forming section 16 is heated, and the image forming apparatus 1 transitions to the ready state, the CPU 31 performs the print process on the basis of the facsimile image signal (ACT 31). In other words, the CPU 31 performs the job generated on the basis of the facsimile image signal. When the print process is performed, the CPU 31 transitions to ACT 17 illustrated in FIG. 3. With this configuration, the CPU 31 controls the power circuit 24, causes the power circuit 24 to stop the power supply to the conveyance section 15 and the image forming section 16, and transitions to the power saving mode.

In addition, in a case where it is determined that the facsimile image signal is not received in ACT 29 (ACT 29, NO), the CPU 31 determines whether the facsimile call signal received in ACT 27 is transmitted from the extension or transmitted from the external line (ACT 32). For example, the CPU 31 determines whether the facsimile call signal is received through the extension or the external line on the basis of the waveform of the facsimile call signal received by the second communication interface 22. In addition, the second communication interface 22 may be configured to determine whether the facsimile call signal is transmitted through the extension or the external line on the basis of the waveform of the received facsimile call signal, and to supply a signal corresponding to the determination result to the CPU 31.

In a case where it is determined that the facsimile call signal is transmitted from the external line (ACT 32, NO), the CPU 31 determines a transmission error, transitions to ACT 17 of FIG. 3, and transitions to the power saving mode. With this configuration, the CPU 31 controls the power circuit 24, causes the power circuit 24 to stop the power supply to the conveyance section 15 and the image forming section 16, and transitions to the power saving mode. Further, the CPU 31 may be configured to transition to the process of ACT 29 and repeatedly perform the processes of ACT 29 and ACT 32 during a period of the predetermined time in a case where it is determined that the facsimile call signal is transmitted from the external line, and the facsimile image signal is not received. In other words, in a case where it is determined that the facsimile call signal is transmitted from the external line, the CPU 31 may be configured to stand by until the facsimile image signal is received for the predetermined time.

In a case where it is determined that the facsimile call signal is transmitted from the extension (ACT 32, YES), the CPU 31 transitions to the process of ACT 12 of FIG. 3. In other words, the CPU 31 switches the image forming apparatus 1 from the power saving mode to the warming-up state of the normal mode. With this configuration, the CPU 31 starts to heat the fixing device of the image forming section 16, transitions the image forming apparatus 1 to the ready state, and transitions the job-standby state.

As described above, in a case where the facsimile call signal is received and facsimile image signal is not received in the power saving mode, the image forming apparatus 1 is switched from the power saving mode to the warming-up state of the normal mode. With such a configuration, the user with the communication device 3 transmits a voice call signal to the facsimile number (address) of the image forming apparatus 1 by the communication device 3 before approaching the image forming apparatus 1 in order to perform any job by the image forming apparatus 1. With this configuration, the image forming apparatus 1 receives the facsimile call signal from the telephone line exchange 4, and enters a state that the facsimile image signal is not received. With this configuration, the image forming apparatus 1 is switched from the power saving mode to the warming-up state of the normal mode. With this configuration, during a period while the user with the communication device 3 approaches the image forming apparatus 1, the fixing device of the image forming section 16 is heated. As a result, the image forming apparatus 1 transitions to the ready state at an earlier timing compared to the configuration of switching to the warming-up state after the user approaches the image forming apparatus 1. In other words, the image forming apparatus 1 can reduce a period of time taken for transition from the power saving mode to the ready state of the normal mode.

In addition, the image forming apparatus 1 is switched from the power saving mode to the warming-up state of the normal mode in a case where the facsimile call signal is received from the extension and the facsimile image signal is not received in the power saving mode. The image forming apparatus 1 keeps the power saving mode in a case where the facsimile call signal is received from the external line and the facsimile image signal is not received in the power saving mode. With this configuration, it is possible to prevent the image forming apparatus 1 from being switched to the warming-up state according to a signal from the external line. With this configuration, it is possible to prevent a wasteful warming-up.

Further, the functions described in the above embodiments are not limited to a hardware configuration, and may be realized by a program which is embedded with the functions using software modules and read by a computer. In addition, the functions may be configured by appropriately selecting some of software and hardware modules.

While certain embodiments have been described, these embodiments have been presented by way of example only, and are not intended to limit the scope of the inventions. Indeed, the novel embodiments described herein may be embodied in a variety of other forms; furthermore, various omissions substitutions and changes in the form of the embodiments described herein may be made without departing from the spirit of the inventions. The accompanying claims and their equivalents are intended to cover such embodiments or modifications as would fall within the scope and spirit of the inventions.

What is claimed is:
1. An image forming apparatus, comprising:
an image forming section configured to form a toner image in a print medium and fix the toner image by a heated fixing device;

a power circuit configured to supply power to the image forming section to heat the fixing device;
a communication interface configured to receive a facsimile call signal and a facsimile image signal; and
a system controller configured to:
  control the power circuit to supply power to the image forming section to heat the fixing device, when the facsimile image signal is received;
  control the power circuit to not supply power to the image forming section to heat the fixing device, when the facsimile image signal is not received and the facsimile call signal is based on a signal from an external line; and
  control the power circuit to supply power to the image forming section to heat the fixing device, when the facsimile image signal is not received and the facsimile call signal is based on a signal from an extension.

2. The apparatus according to claim 1, wherein
when a temperature of the fixing device becomes equal to or more than a predetermined temperature, the system controller is configured to control the image forming section to cause the image forming section to form an image in the print medium, and control the power circuit to stop supplying power to the image forming section.

3. The apparatus according to claim 1, wherein
when the facsimile call signal, based on the signal from the extension, is received in a state where the power supply from the power circuit to the image forming section is stopped, the system controller is configured to control the power circuit to supply power to the image forming section, and heat the fixing device.

4. The apparatus according to claim 1, wherein the fixing device includes a fixing roller.

5. The apparatus according to claim 1, wherein
when the facsimile call signal, based on the signal from the external line, is received, the system controller is configured to stand by for a predetermined time until the facsimile image signal is received.

6. A control method of an image forming apparatus, where the image forming apparatus includes an image forming section configured to form a toner image in a print medium and fix the toner image by a heated fixing device, a power circuit configured to supply power to the image forming section to heat the fixing device, a communication interface configured to receive a facsimile call signal and a facsimile image signal, and a system controller, wherein the control method comprises:
  controlling the image forming section and the power circuit such that, when the facsimile call signal and the facsimile image signal are received, the image forming section and the power circuit are controlled to form an image by the image forming section on the basis of the facsimile image signal,
  when the facsimile image signal is received, controlling the power circuit to supply power to the image forming section to heat the fixing device,
  when the facsimile image signal is not received and the facsimile call signal is based on a signal from an external line, controlling the power circuit to not supply power to the image forming section to heat the fixing device, and
  when the facsimile image signal is not received and the facsimile call signal is based on a signal from an extension, controlling the power circuit to supply power to the image forming section to heat the fixing device.

7. The method according to claim 6, wherein
when a temperature of the fixing device becomes equal to or more than a predetermined temperature, to the control method further comprises:
  controlling the image forming section to cause the image forming section to form an image in the print medium; and
  controlling the power circuit to stop supplying power to the image forming section.

8. The method according to claim 6, wherein
when the facsimile call signal, based on the signal from the extension, is received in a state where the power supply from the power circuit to the image forming section is stopped, the control method further comprises:
  controlling the power circuit to supply power to the image forming section, and heating the fixing device.

9. The method according to claim 6, wherein the fixing device includes a fixing roller.

10. The method according to claim 6, when the facsimile call signal, based on the signal from the external line, is received, the control method further comprises:
  standing by for a predetermined time until the facsimile image signal is received.

* * * * *